UNITED STATES PATENT OFFICE 2,382,036

BIS(2-CYANOETHYL) ETHER AND PROCESS FOR MAKING SAME

Herman A. Bruson, Philadelphia, Pa., assignor to The Resinous Products & Chemical Company, Philadelphia, Pa., a corporation of Delaware No Drawing. Application January 10, 1941, Serial No. 373,944

2 Claims. (Cl. 260—464)

This invention relates to bis(2-cyanoethyl) ether, $NCCH_2CH_2—O—CH_2CH_2CN$, and to a method for its preparation.

Attempts to make this compound by heating bis(2-chloro-ethyl) ether with alkali metal cyanides, or with cuprous cyanide according to the methods ordinarily used for replacing halogen atoms with cyano groups, for example by boiling under reflux or under pressure in aqueous or non-aqueous media, with or without the use of iodides as catalysts, have not been successful. The products obtained consist of the chloro-nitrile, $ClCH_2CH_2—O—CH_2CH_2CN$, which resist further nitrilization, and unsaturated compounds formed by dehydro-halogenation.

According to the present invention, bis(2-cyanoethyl) ether is obtained in high purity and in good yields by reacting upon acrylonitrile with ethylene cyanohydrin in the presence of alkaline condensing agents or catalysts. Alkaline catalysts which may be used include the oxides, hydroxides, alcoholates, phenolates or amides of the alkali metals, the alkaline earth hydroxides, or the strongly basic non-metallic hydroxides such as the quaternary ammonium hydroxides. Good results are obtained by the use of sodium hydroxide, potassium hydroxide, calcium hydroxide, or benzyl trimethyl ammonium hydroxide, preferably in aqueous solution. Other alkaline catalysts such as sodium oxide, sodium methylate or sodium amide can also be used, but with no advantage over the hydroxides. The quantity of catalyst used is preferably small, amounts of the order of from about 0.5 to 5% of the reactants by weight being usually sufficient. The reaction takes place in aqueous solutions as well as in non-aqueous inert liquid media such as dioxane, benzene, xylene, and the like. In most cases, the reaction takes place at or near ordinary room temperature and can be appreciably accelerated by warming to from about 40° to 60° C.

The reaction may be formulated as follows:

In order to isolate the bis(2-cyanoethyl) ether, which is a water-soluble compound, it has been found advantageous to neutralize the alkalinity present in the reaction mixture after the completion of the condensation and either to separate the desired product by solvent extraction with a water-immiscible solvent such as ethylene dichloride or to remove it directly by distillation under reduced pressure.

It has furthermore been found that, if sufficient water is present during the condensation, the separate addition of ethylene cyanohydrin can be entirely or in part dispensed with, since the water apparently reacts with the acrylonitrile to form ethylene cyanohydrin in situ.

and this in turn condenses with more acrylonitrile to form bis(2-cyanoethyl) ether. Whatever may be the mechanism of the reaction, both processes may be considered as equivalents for the purpose of this invention since one may use either preformed ethylene cyanohydrin and acrylonitrile, or water and acrylonitrile to accomplish the same result. However, the yields are higher if preformed ethylene cyanohydrin is used.

The following examples illustrate this invention:

Example 1

A mixture consisting of 71 g. of ethylene cyanohydrin (1 mol) and 53 g. of acrylonitrile (1 mol) was cooled to 10° C. and, while the mixture was being stirred, 1 g. of 50% sodium hydroxide solution was added thereto. Thereafter, the mixture was rapidly stirred and held by means of external cooling for five hours between 15–20° C. It was then allowed to warm up spontaneously to 45° C., and after a short time was again cooled and held at a temperature range of 20–25° C. during two hours. At the end of this time, the reaction mixture was made slightly acid to brom-thymol blue indicator by means of dilute hydrochloric acid and mixed with 50 cc. of ethylene dichloride. The aqueous layer was separated, and the ethylene dichloride extract was distilled under reduced pressure. The bis(2-cyanoethyl) ether distilled over between 150° and 160° C. at 4 mm. Upon redistillation through an 8″ column it boiled at 161–163° C./5.5 mm. The yield was 103 g. or 83% of theoretical.

Example 2

A mixture of 53 g. of acrylonitrile, 50 cc. of dioxane, and 10 cc. of 10% sodium hydroxide solution was stirred and heated six hours at 45° C. The alkali was then neutralized with dilute hydrochloric acid, the dioxane evaporated under reduced pressure on a steam bath, and the residual oil filtered and distilled in high vacuo.

Bis(2-cyanoethyl) ether distilled over between 160° and 170° C./5–6 mm. The yield of pure product was 28 g.

Example 3

A mixture consisting of 71 g. of ethylene cyanohydrin, 53 g. of acrylonitrile, 120 g. of benzene and 4 g. of trimethyl benzyl ammonium hydroxide (40% aqueous solution) was stirred at 45–55° C. for six hours. The mixture was neutralized with dilute hydrochloric acid and the benzene layer separated and distilled first at ordinary pressure to remove the benzene, then under reduced pressure. The bis(2-cyanoethyl) ether came over at 160–170° C./5–6 mm. in 70% yield.

Bis(2-cyanoethyl) ether is a colorless, odorless, oily liquid, having a specific gravity at 25° C. of 1.0482. Its refractive index $N_D^{25}$ is 1.4407. It is insoluble or only slightly soluble in petroleum ether, ethyl ether or carbon tetrachloride but is soluble in water, methanol, chloroform, dioxane, benzene, and ethylene dichloride. It decomposes upon distillation at atmospheric pressure.

It is useful as a solvent and as an intermediate for the preparation of the corresponding dicarboxylic acid amide $H_2NCOC_2H_4$—O—$C_2H_4CONH_2$ or the free dicarboxylic acid, by hydrolysis with aqueous sulfuric acid. It may also be used for making the corresponding diamine $H_2NCH_2CH_2CH_2$—O—$CH_2CH_2CH_2NH_2$ by hydrogenation, or for preparing esters. All of these products are useful in the manufacture of synthetic resins and plasticizers.

I claim:

1. Process which comprises reacting two mols of acrylonitrile with one mol of water in the presence of an alkaline catalyst.

2. Process for the preparation of bis(2-cyano ethyl)-ether which comprises reacting acrylonitrile with water in the presence of an alkaline catalyst.

HERMAN A. BRUSON.